(12) United States Patent
Crudele et al.

(10) Patent No.: US 10,078,542 B2
(45) Date of Patent: Sep. 18, 2018

(54) MANAGEMENT OF COMPUTING MACHINES WITH TROUBLESHOOTING PRIORITIZATION

(71) Applicant: International Business Machines Corporation, Armonk, NY (US)

(72) Inventors: Michele Crudele, Rome (IT); Rosario Gangemi, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/942,095

(22) Filed: Nov. 16, 2015

(65) Prior Publication Data

US 2017/0139766 A1 May 18, 2017

(51) Int. Cl.
*G06F 11/00* (2006.01)
*G06F 11/07* (2006.01)

(52) U.S. Cl.
CPC ...... *G06F 11/0781* (2013.01); *G06F 11/0709* (2013.01); *G06F 2201/875* (2013.01)

(58) Field of Classification Search
CPC ............. G06F 11/0781; G06F 11/0709; G06F 11/1608; G06F 11/1629; G06F 11/1633; G06F 11/3006; G06F 11/3024; G06F 2201/875
USPC .......................... 714/48, 25, 47.1, 33, 37, 45
See application file for complete search history.

(56) References Cited

U.S. PATENT DOCUMENTS

| | | | |
|---|---|---|---|
| 6,574,537 B2 * | 6/2003 | Kipersztok | G05B 23/0278 701/31.8 |
| 7,302,397 B1 | 11/2007 | Hein et al. | |
| 8,539,545 B2 | 9/2013 | Kartha et al. | |
| 8,661,505 B2 | 2/2014 | Kougiouris et al. | |
| 9,065,804 B2 | 6/2015 | Sweet et al. | |
| 2010/0094677 A1 | 4/2010 | Peltz et al. | |
| 2014/0344622 A1* | 11/2014 | Huang | G06F 11/079 714/37 |
| 2015/0143524 A1 | 5/2015 | Chestna | |
| 2017/0012814 A1* | 1/2017 | Zaidi | H04L 41/5009 |

OTHER PUBLICATIONS

Crudele et al., "Refining of Applicability Rules of Management Activities According to Missing Fulfilments Thereof", U.S. Appl. No. 15/425,497, filed Feb. 6, 2017, 32 pages.

* cited by examiner

*Primary Examiner* — Joseph D Manoskey
(74) *Attorney, Agent, or Firm* — Alexa L. Ashworth; A. Imtiaz Billah

(57) ABSTRACT

A solution is proposed for managing a plurality of computing machines. A corresponding method comprises causing each computing machine of at least part of the computing machines to execute a management activity on the computing machine; receiving a corresponding result of the execution of the management activity on each computing machine; determining a success fingerprint according to one or more characteristics of each of at least part of one or more wherein the corresponding result is indicative of a success of the execution of the management activity thereon; calculating a similarity index for each of one or more failure ones of the computing machines wherein the corresponding result is indicative of a failure of the execution of the management activity thereon; and prioritizing the computing machines which failed to accept a policy according to the corresponding similarity indexes.

21 Claims, 9 Drawing Sheets

MANAGEMENT OF COMPUTING MACHINES WITH TROUBLESHOOTING PRIORITIZATION

BACKGROUND OF THE INVENTION

The present disclosure relates to the information technology field and more specifically, to the management of computing machines.

The management of computing machines plays a key role in several contexts, especially in large organizations with a high number of computing machines (for example, up to some hundreds of thousands of computing machines). For this purpose, various resource management tools are available for facilitating the management of the computing machines. Endpoint management programs are commercial examples of resource management tools which facilitate the management of the computing machines.

In practical situations, the application of the policies may fail on some of the computing machines. In such an event, a troubleshooting of the failures should be performed in an attempt to solve the corresponding problems. For example, the implementation of security in a cloud computing environment includes commands sent from a grid to an agent executive executed in a virtual machine to check the security, the compliance, and the integrity of the virtual machine processes and data structures. Based on these checked results, additional commands are sent by the grid to the agent executive to correct security, compliance, or integrity problems to prevent security compromises.

However, the troubleshooting is a complex process. Indeed, the troubleshooting at first requires identifying the (alleged) cause of each failure (e.g., utilizing the process of elimination). After determining a solution which is likely to remedy the failure, the solution is executed and verified for correctness. However, this process may be very time consuming and expensive, especially in instances where a high number of failures occurred.

It may be useful to prioritize the failures for their troubleshooting. While prioritizing problems in IT services, an incident cost, a workaround cost, an expected resolution cost, and a total cost for each problem can be determined. A priority may be assigned to each problem such that each priority has an expected resolution time. The priorities are assigned such that the total cost for fixing all the problems is lower than any other selection of priorities It is quite difficult (and at times impossible) to identify the computing machines. If the application of each policy failed, then the policy may be initially investigated. Since the compliance with the policy is most relevant, an important security patch may be executed thereon. Thus, the solution of the corresponding problems may be significantly delayed by the investigation of other computing machines whose compliance with the policy may be less relevant (and possibly not relevant). As a consequence, some of the computing machines may be left in a critical condition for a relatively long time, along with corresponding risks of the computer machines' integrity (e.g., security exposures).

SUMMARY

According to one embodiment of the present invention, a method for managing a plurality of computing machines is provided, the method comprising: executing, by one or more processors, a management activity on the computing machine; receiving, by one or more processors, a corresponding result of the execution of the management activity on each computing machine; determining, by one or more processors, a success fingerprint according to one or more characteristics of each computing machine based on comparison with another computing machine wherein the management activity is successfully executed on the another computing machine; calculating, by one or more processors, a similarity index for each of one or more computing machines wherein the management activity is not successfully executed on the one or more computing machines by comparing the one or more computing machines wherein the management activity is not successfully executed on the one or more computing machines with the success fingerprint according to the one or more characteristics of one or more computing machines wherein the management activity is successfully executed on the computing machines; prioritizing, by one or more processors, the failure of the one or more computing machines wherein the management activity is not successfully executed on the one or more computing machines, and outputting, by one or more processors, an indication of failure of the one or more computing machines wherein the management activity is not successfully executed on the one or more computing machines for use in troubleshooting the corresponding failures.

Another embodiment of the present invention provides a computer program product for managing a plurality of computing machines, based on the method described above.

Another embodiment of the present invention provides a computer for managing a plurality of computing machines, based on the method described above.

This may have the advantage of reducing the number of computing machines (i.e., endpoints) to be investigated when policies fail to be executed on the computing machines. Embodiments of the present invention may additionally have the advantage that the computing machines where policies fail to be executed are identified. Embodiments of the present invention may further have the advantage that the computing machines are qualified via a similarity index to better identify the failed computing machines and troubleshooting solutions are devised to address failed computing machines.

DETAILED DESCRIPTION

The resource management tools may be based on policies. Each policy indicates a management activity that has to be executed on the computing machines to make them compliant therewith (e.g., the application of a patch to a software program). The policies are deployed to the computing machines, wherein the policies are applied by executing the corresponding management activities. This reduces the administrative effort required to manage the computing machines, since the focus is shifted from management of the computing machines at an individual level to the definition of the policies at an aggregate level. Generally, each policy also indicates an applicability rule thereof (for example, the availability of a specific operating system); the policy is then applied only on the computing machines that fulfill its applicability rule. This allows executing the management activities efficiently where they are actually relevant.

Figure 1:
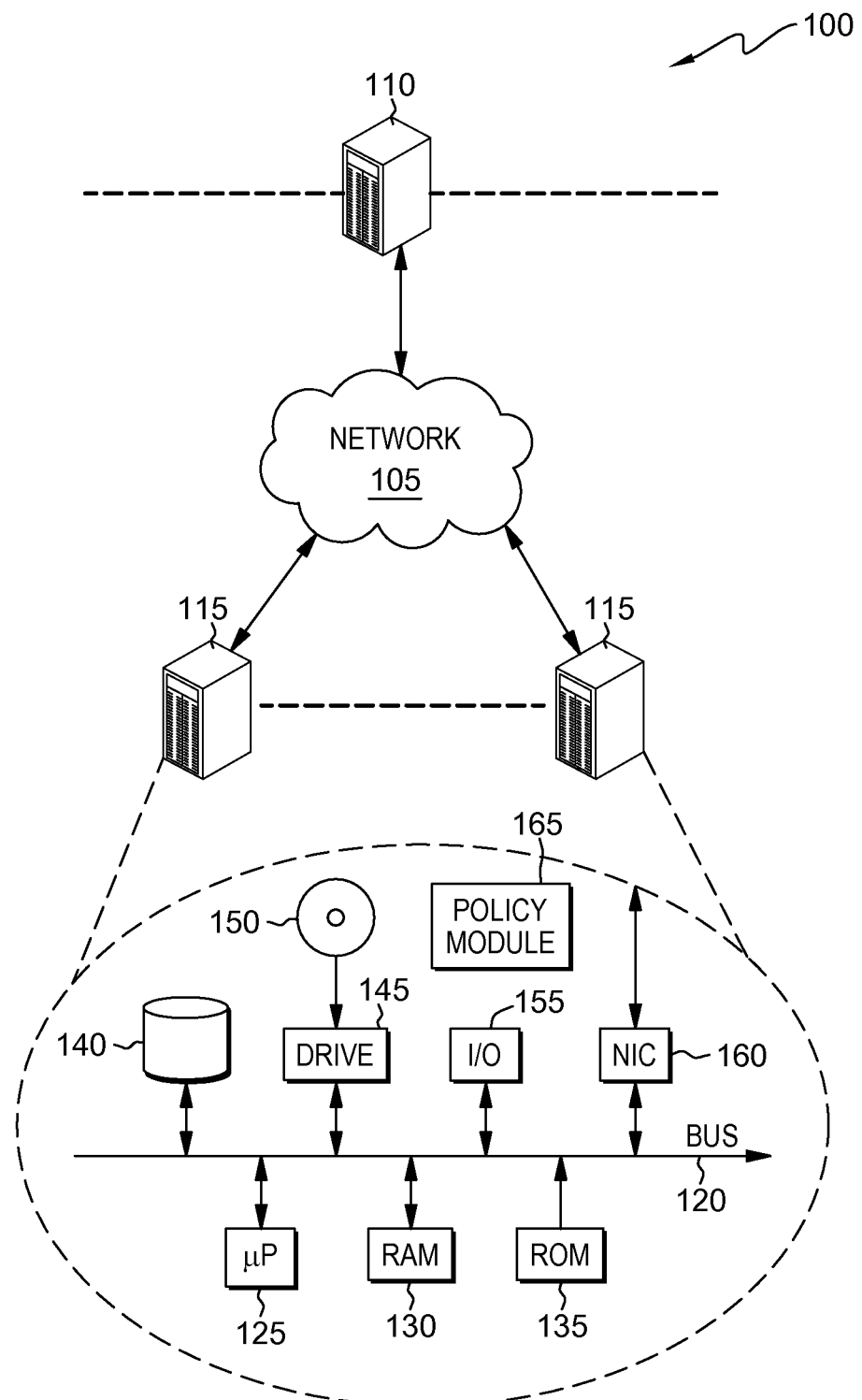
FIG. 1 shows a schematic block-diagram of a computing system wherein the solution according to an embodiment of the present disclosure may be implemented.

With reference in particular to FIG. 1, a schematic block-diagram is shown of a computing system 100 wherein the solution according to an embodiment of the present disclosure may be implemented.

Computing system 100 has a distributed architecture, wherein multiple computing machines are connected with each other through communication network 105 (e.g., the Internet, LAN, WiFi, etc.). One or more computing machines are referred to as server computing machine (or simply a "server") 110 and endpoint computing machines (or simply an "endpoint") 115. Server computing machine 110 controls the management of the other computing machines such as endpoint computing machine 115.

Server computing machine 110 is a computer program or a machine capable of accepting requests from clients and responding to them. The main function of server computing machine share data or hardware and software resources among clients. This architecture is called the client-server model. The clients may run on the same computer, but typically connect to the server through a network. Server machines (which can be either actual or virtual machines) run server programs Typical computing servers are database servers, file servers, mail servers, print servers, web servers, game servers, and application servers. In turn, a server program turns the machine on which it runs into a server machine. A server may be composed of large clusters of relatively simple, replaceable machines.

Endpoint computing machine 115 is a computing system which may include a server, a desktop or laptop PC, a PDA, a Smartphone, a printer, switch or Internet of Things (IoT) devices. In some embodiments, endpoint computing machine 115 is a host, such as a conventional desktop PC, typically having a main processor, possibly one or more coprocessors, and typically running an operating system. Additional subsystems such as various peripherals, network interface devices, modems, etc. are sometimes connected to such endpoint hosts for a variety of purposes.

Each server computing machine 110 and endpoint computing machine 115 comprise several units which are connected in parallel to bus structure 120. The architecture of server computing machine 110 and endpoint computing machine 115 is suitably scaled according to the actual function of server computing machine 110 and endpoint computing machine 115. One or more microprocessors µP 125 control the operations of server computing machine 110 and endpoint computing machine 115. RAM 130 is used as working memory by microprocessor 125. ROM 135 stores basic code for a bootstrap of server computing machine 110 and endpoint computing machine 115. Server computing machine 110 and endpoint computing machine 115 are provided with a mass-memory comprising of one or more hard-disks 140 and drives 145 for reading/writing removable storage units 150 (e.g., optical disks). Moreover, server computing machine 110 and endpoint computing machine 115 have input/output (I/O) units 155 (e.g., a keyboard, a mouse, and a monitor). Network adapter (NIC) 160 is used to connect server computing machine 110 and endpoint computing machine 115 to network 105. Policy module 165 is applied on policy-based systems management where endpoints are managed based on a relevance condition which determines the applicability of the action carried by the policy.

Policy module 165 is implemented as a method and system to prioritize troubleshooting processes in a policy-based endpoint management software. Policy module 165 has the following functionalities: (i) identifying endpoints where a policy does apply among the failed endpoints; (ii) analyzing the results of a distribution of the policy to the endpoints of an organization or a statistical representative subset; and (iii) inferring the characteristics of the endpoints which make the policy applicable to the endpoints. The characteristics of these endpoints are used to analyze the failed endpoints to evaluate expected applicability.

Figure 2A:
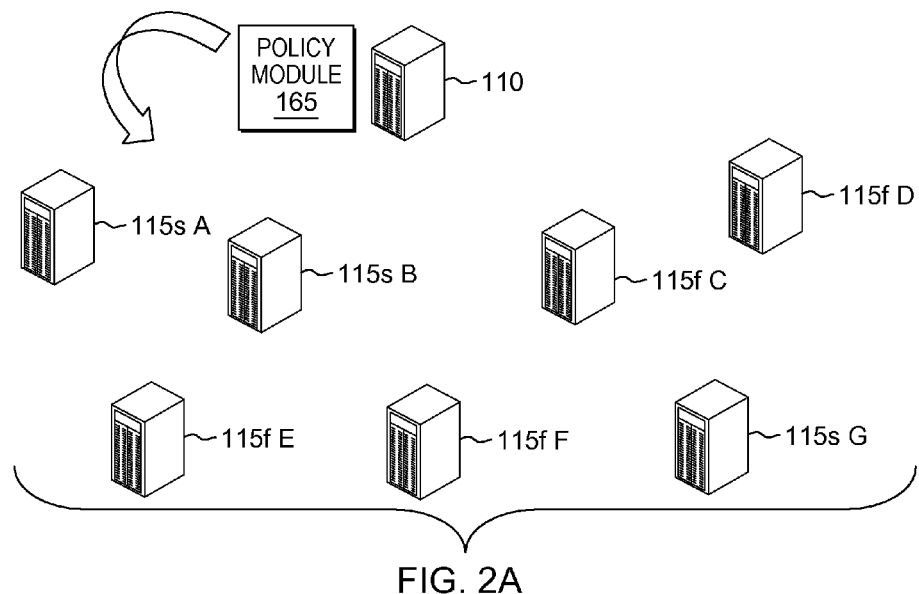
FIG. 2A is an exemplary embodiment of a policy to be performed on endpoints, in accordance with an embodiment of the present invention.

FIG. 2A is an exemplary embodiment of a policy to be performed on endpoints, in accordance with an embodiment of the present invention.

Policy module 165 works in conjunction with server computing machine 110 to facilitate each unit of endpoint computing machine 115 (or at least part of an endpoint) in order to execute a management activity thereon (e.g., enforcing the application of a corresponding policy). In other embodiments, the management activity may be executed on any number of computing machines when a desired configuration of specific endpoints, identified either explicitly by their hostnames or implicitly by their category, is defined by one or more policies which they should be compliant with. Moreover, the management activity may be deployed in any way (even without any dedicated deployment infrastructure) and it may be enforced in any way (e.g., a server that triggers the evaluation of the policies on all the endpoints and then remedies any non-compliance therewith, with the endpoints that directly retrieve the applicable policies, evaluate them and remedy any non-compliance therewith, or even with a declarative approach without the definition of any policies). The management activity may be of any type (e.g., the downloading of data or the acquisition of a license entitlement) and it may be executed in any way (e.g., by invoking APIs or running scripts). The application of the policy may succeed on some units of endpoint computing device 115 which is denoted with a thumb-up symbol and/or with the text "115s". The application of the policy may fail on some units of endpoint computing device 115 denoted the text "115f". The endpoints where the application of the policy succeeds include: endpoint computer machine 115s A; endpoint computer machine 115s B; and endpoint computer machine 115s G. The endpoints where the application of the policy fails include: endpoint computer machine 115f C; endpoint computer machine 115f D; endpoint computer machine 115f E; and endpoint computer machine 115f F.

Figure 2B:
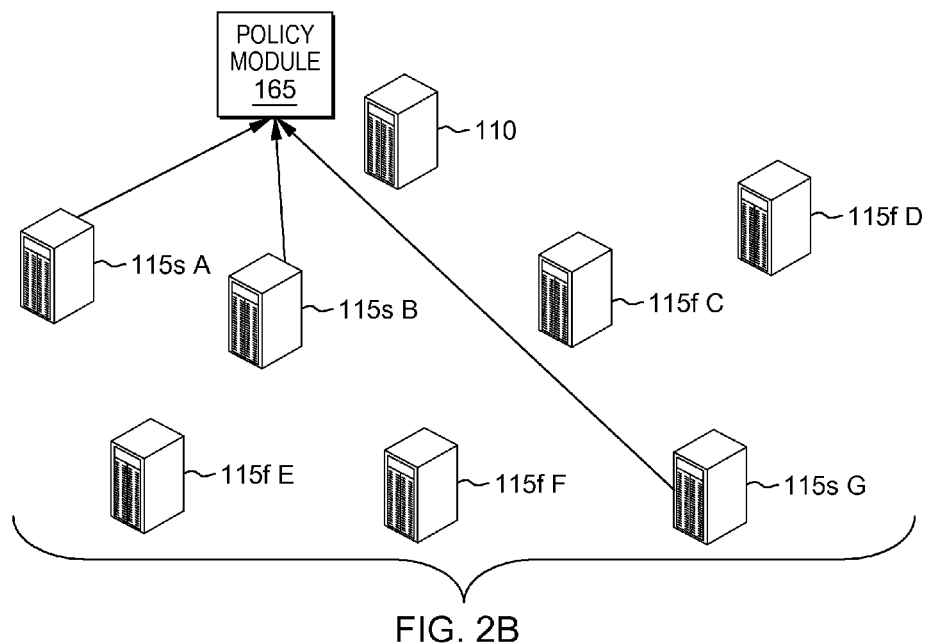
FIG. 2B is an exemplary embodiment of determining a success finger print, in accordance with an embodiment of the present invention.

FIG. 2B is an exemplary embodiment of determining a success finger print, in accordance with an embodiment of the present invention.

Server computing machine 110 receives a corresponding result of the application of the policy on each endpoint computing machine 115 (e.g., by polling the endpoints). In some embodiments, the result may include information such as a time-stamp, or a return code. The result, indicative of a success of the application of the policy on an endpoint, is denoted with "115s." The result, indicative of a failure of the application of the policy on an endpoint, is denoted with "115f."

In the solution according to an embodiment of the present disclosure, policy module 165 facilitates the process where server computing machine 110 determines (e.g., a corresponding return code indicates a warning) a success fingerprint according to one or more characteristics (such as operating system, working memory size, active programs, processing power usage, network connections, installed patches, and/or hostname) of each success endpoint 115s (or at least part thereof) as defined by their common characteristics.

Policy module 165 performs the following functionalities: (i) collecting results of a policy distribution to a set of endpoints, which includes the return code of the execution and a set of properties which are normally not tracked by hardware and software inventory (e.g., the network to which the endpoint is attached at the time of execution); (ii) building a fingerprint for each endpoint, which is based on hardware and software inventory properties, and dynamic properties of an endpoint; (iii) defining the fingerprint (FP) using the format: FP={(K1, V1), . . . (Kn, Vn)} where K is the key of the property, and V is the value of the property which can be a set if the property has multiple values; (iv) splitting the set of endpoints in two groups as a "success" or as a "failure"; and (v) calculating a success fingerprint (SFP) from the fingerprints of endpoints in the success group the system where the SFP is the subset of the properties of the fingerprints which have the same key and SFP values are the union of the values.

For example the SFP of the following fingerprints (FP1, FP2, and FP3) is:

FP1={(osName,Windows),(osVer,7),(DiskSpace,10)}

FP2={(osName,Windows),(osVer,8),(DiskSpace,50)}

FP3={(osName,Windows),(osVer,8),(DiskSpace,5), (Bluetooth,4)}

SFP={(osName,Windows),(osVer,{7,8}),(DiskSpace, {5,10,50})}.

Figure 2C:
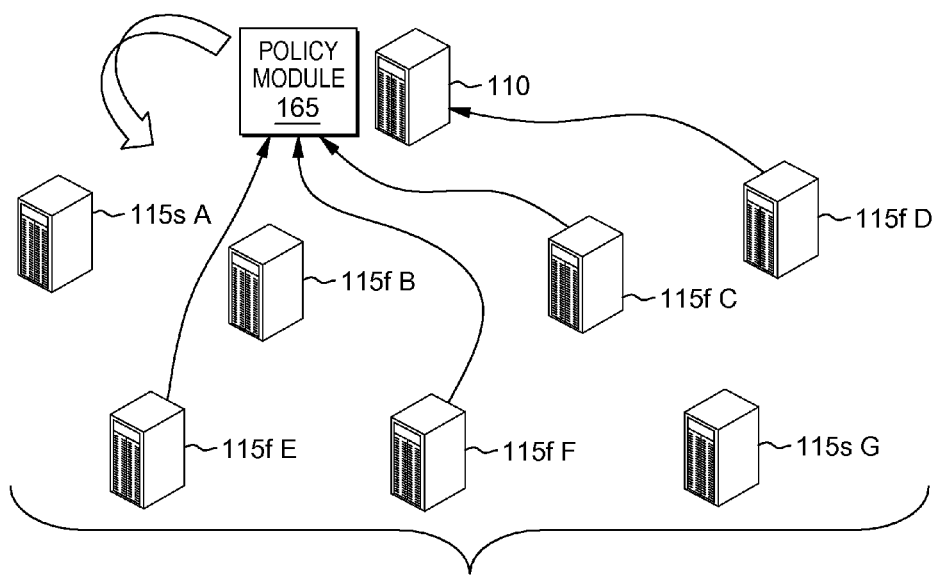
FIG. 2C is an exemplary embodiment of determining a similarity index of a failure endpoint 115$f$, in accordance with an embodiment of the present invention.

FIG. 2C is an exemplary embodiment of determining a similarity index of a failure endpoint 115f, in accordance with an embodiment of the present invention.

Policy module 165 works in conjunction with server computing machine 110 to perform the following functionalities: (i) calculating a similarity index for each instance where the application of a policy fails on an endpoint (i.e., failure endpoint 115f); (ii) calculating the similarity index according to a comparison between the characteristics of failure endpoint 115f and the success fingerprint; and (iii) according to characteristics of failure endpoint 115f, matching the characteristics of failure endpoint 115f to the success fingerprint. In some embodiments, the similarity index may be calculated, for example, by decreasing the similarity index according to characteristics of the failure endpoint that do not match the ones of the success fingerprint. In other embodiments, the similarity index may be calculated without any similarity components (e.g., using fuzzy logic techniques).

For each endpoint in the failure group, policy module 165 tests whether the fingerprint of each endpoint in the failure group (i.e., 115f) is similar to the SFP. The similarity is defined using: (i) "matched_property" equals 1 only if the property is included in the endpoint fingerprint with a subset of the values in the SFP; (ii) "matched_property" equals 0 only if the property is not included in the endpoint fingerpoint with a subset of the values in the SFP; and (iii) "possible_values" equals the number of the values of the property in the SFP. In some embodiments, the similarity index may indicate a category and/or a ranking therein.

The similarity index is defined by:

$$\text{Sum exp}(\text{"matched\_property"} - \text{"possible\_values"}) \quad \text{(eq. 1)}$$

The maximum value of the similarity index is defined by the sum of all SFP properties of the quantity of exp (1−"possible_values). The maximum value of the similarity index is verified by definition for all the endpoints in the success set and for endpoints whose fingerprint has all the SFP properties with matching values. For the SFP, where "matched_property" is 1, the maximum value of the similarity index is:

$$\exp(1-1)+\exp(1-2)+\exp(1-3)=\exp(0)+\exp(-1)+\exp(-2).$$

Some additional examples of the maximum value of the similarity index is:

FP4={(osName,Windows),(osVer,7),(DiskSpace,5), (Bluetooth,3)}

Sum=exp(0)+exp(−1)+exp(−2)which is the maximum

FP5={(osName,Linux),(osVer,7),(DiskSpace,5),(Bluetooth,3)}

Sum=exp(−1)+exp(−2)

FP6={(osName,Windows),(osVer,6),(DiskSpace,51), (Bluetooth,3)}

Sum=exp(0)

FP7={(osName,Windows),(osVer,6),(DiskSpace,25), (Bluetooth,4)}

Sum=exp(0)

Figure 2D:
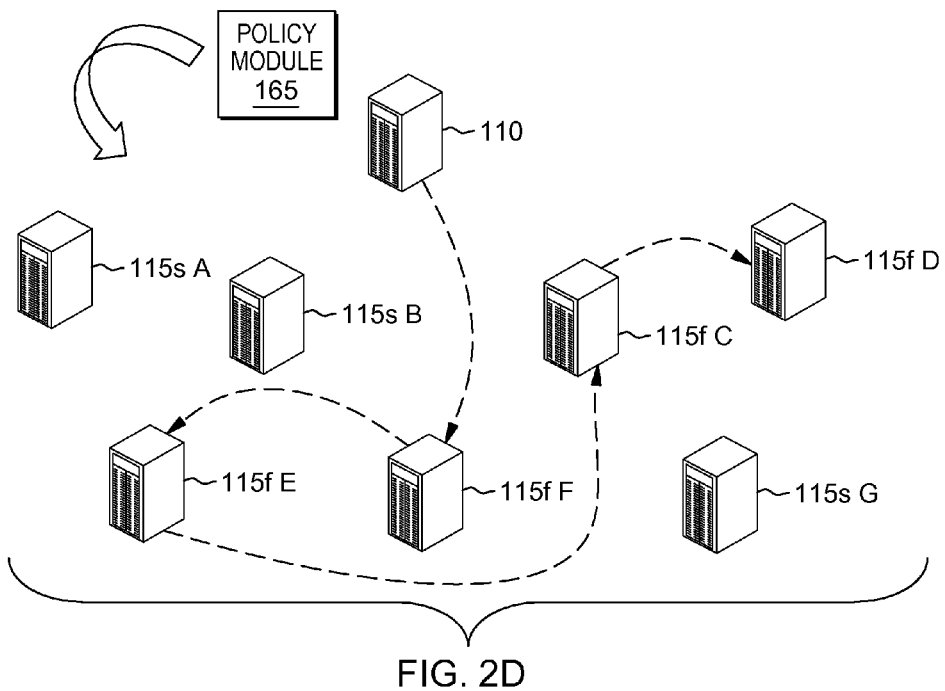
FIG. 2D is an exemplary embodiment of failure endpoints 115$f$ prioritized according to the corresponding similarity indexes, in accordance with embodiments of the present invention.

FIG. 2D is an exemplary embodiment of failure endpoints 115f prioritized according to the corresponding similarity indexes, in accordance with embodiments of the present invention.

For example, policy module 165 assigns a priority to failure endpoints 115f in decreasing order of the corresponding similarity indexes. An indication of the prioritization of failure endpoints 115f is provided by notifying a system administrator accordingly). This information is used for troubleshooting the failures (i.e., any process attempting to solve corresponding problems) of failure endpoints 115f by investigating failure endpoints 115f in succession according to the priorities as indicated by corresponding arrows in broken line. The order of investigation is: Failure endpoint 115*f* F is investigated first, failure endpoint 115*f* E is investigated second, failure endpoint 115*f* C is investigated third, and failure endpoint 115*f* D is investigated fourth. In other embodiments, the failure endpoints 115*f* may be prioritized in any way (e.g., discarding the endpoints whose similarity indexes are below a predefined threshold).

The above-described solution facilitates the identification of the failure endpoints 115*f* whose compliance with the policy is most relevant. Indeed, the success fingerprint indicates the characteristics of the endpoints that make the policy applicable to the endpoints. As far as the compliance with the policy is concerned, failure endpoints 115*f* with higher similarity indexes are substantially equal to success endpoints 115*s*. Therefore, it is likely that the application of the policy thereon is very important. Conversely, failure endpoints 115*f* with lower similarity indexes are significantly different from the success endpoints 115*s* and therefore, it is likely that the application of the policy thereon is less important. As a result, failure endpoints 115*f* whose compliance with the policy is most relevant may be investigated firstly (by instead delaying the investigation of the other failure endpoints 115*f* whose compliance with the policy is less relevant). Furthermore, the time during which failure endpoints 115*f* are left in a critical condition is significantly reduced, with corresponding reduction of any risks of the integrity of failure endpoints 115*f* (e.g., security exposures). It is likely that the policy had actually been applied on failure endpoints 115*f* with sufficiently high similarity indexes, but that some problems prevented its successful application. Conversely, it is likely that the policy had not been applied at all on failure endpoints 115*f* with very low similarity indexes (e.g., when it was applied thereon by mistake). Therefore, it is also possible to completely avoid troubleshooting the corresponding failures because the policy relates to a different operating system. As a consequence, the number of failure endpoints 115*f* to be investigated may be drastically reduced and correspondingly save time and costs.

Figure 3:
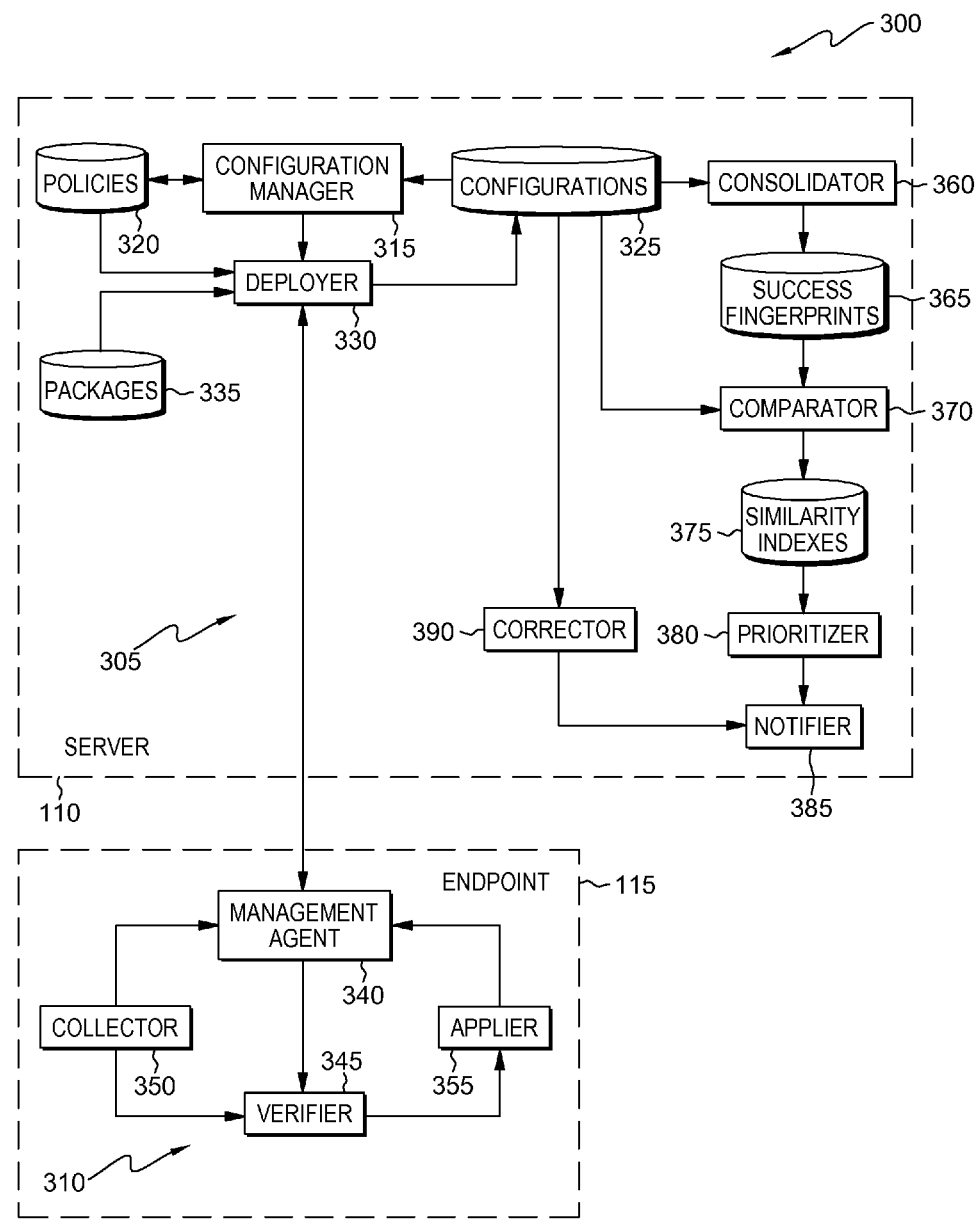
FIG. 3 is an exemplary embodiment of the main software components used to implement the solution, in accordance with an embodiment of the present invention.

FIG. 3 is an exemplary embodiment of the main software components used to implement the solution, in accordance with an embodiment of the present invention.

All the software components (programs and data) are denoted as a whole with the reference 300. The software components 300 are typically stored in the mass memory and loaded (at least partially) into the working memory of each server computing machine 110 and endpoint computing machine 115 when the programs are running. The programs are initially installed into the mass memory, for example, from removable storage units or from a network. In this respect, each software component may represent a module, segment or portion of code, which comprises one or more executable instructions for implementing a specified logical function.

Software components 300 run a resource management tool based on policies, or rules (for example, the above-mentioned IEM), which resource management tool comprises: server-side component 305 running on server computing machine 110 and endpoint-side component 310 running on each endpoint computing machine 115 (only one shown in the figure).

Starting from server-side component 305, a configuration manager 315 controls the management of one or more endpoint computing machines 115. For this purpose, configuration manager 315 controls (in read/write mode) a policy repository 320, which stores one or more policies that are available to manage the one or more endpoint computing machines 115. The policies are defined at high level independent of an actual implementation of the one or more endpoint computing machines 115. Particularly, each policy indicates an application action to be executed on each of the one or more endpoint computing machines 115 to make the one or more endpoint computing machines 115 compliant with the policy. For example, the application action may indicate a controlled sequence of application commands for installing a software product, for upgrading the software product to a different version, for applying a service pack or a patch on the software product. Moreover, the policy may indicate an applicability rule, or relevance, which defines the endpoint computing machine 115 on which the policy has to be applied. For example, the applicability rule may indicate the availability of a specific operating system, the availability of a minimum processing power, or the availability of a minimum free mass memory space.

Configuration manager 315 also accesses (in read mode only) configuration repository 325, which stores configuration information of each endpoint computing machine 115. The configuration information indicates one or more static characteristics of endpoint computing machine 115 where the static characteristics are hardware, software and/or logic characteristics of endpoint computing machine 115 (typically tracked by inventory processes), which do not depend on the specific time of application of the policies on an operating system, mass memory size, network domain. The configuration information then indicates the policies that have been applied on endpoint computing machine 115. For each of these policies, the configuration information indicates the corresponding result (i.e., "success" or "fail") and then the actual compliance of endpoint computing machine 115 to the policy. Moreover, the configuration information indicates one or more dynamic characteristics of endpoint computing machine 115. The dynamic characteristics are hardware, software and/or logic characteristics of endpoint computing machine 115 (typically not tracked by inventory processes), which depend on the specific time of application of the policy on running services, working memory usage, logged users, etc. The (static/dynamic) characteristics of each endpoint computing machine 115 define a signature thereof. The static characteristics indicate configuration features (for all the policies) and the dynamic characteristics indicate contingent features (individually for each policy) that may be significant for the result of the application of the policies thereon. The configuration manager 315 exposes a user interface (for example, a GUI), which may be used by a system administrator to maintain (i.e., create, update, delete) the policies, to enforce their application (for example, according to a management plane) and to inspect a status of the computing system (as defined by the configuration information of endpoint computing machine 115).

Configuration manager 315 controls deployer 330, which is used to deploy the policies to endpoint computing machine 115 for the application of the policies on an ad-hoc deployment infrastructure (which is not shown). For this purpose, deployer 330 accesses (in read mode only) policy repository 320 and package repository 335, which stores packages that are required to apply the policies. For example, each package comprises the software product to be installed or upgraded, the patches or the service pack to be applied. Deployer 330 also controls (in read/write mode) the configuration repository 325 for updating the configuration information of each endpoint in response to the application of the policies thereon.

Within endpoint-side component 310, management agent 340 controls the application of the policies on endpoint computing machine 115. For this purpose, management agent 340 controls verifier 345, which is used to verify whether each policy is to be applied on the endpoint 115 (i.e., whether it fulfills the corresponding applicability rule). Verifier 345 exploits collector 350 to collect the (static) characteristics of endpoint computing machine 115 used to verify the applicability rules. Verifier 345 controls applier 355, which enforces the application of each policy (i.e., the execution of the corresponding application action) on endpoint computing machine 115. Applier 355 interfaces with management agent 340 to report the result of the application of each policy on the collector 350. Moreover, management agent 340 invokes collector 350 to collect the dynamic characteristics of endpoint computing machine 115 in correspondence to the application of each policy thereon.

Deployer 330 (of server computing machine 110) communicates with management agent 340 (of each endpoint computing machine 115) via management messages (known as fixlets in the IEM). The management messages are used for the following functionalities: (i) deploy the policies from server computing machine 110 to endpoint computing machine 115; (ii) to return the results of the application of the policies from endpoint computing machine 115 to the server computing machine 110; and/or (iii) to collect (static/dynamic) characteristics of endpoint computing machine 115 by server computing machine 110.

In the solution according to an embodiment of the present disclosure, server computing machine 110 further runs consolidator 360 for determining the success fingerprint of each policy that has been deployed to endpoint computing machine 115. Consolidator 360 accesses (in read mode only) configuration repository 325 and controls (in read/write mode) success fingerprint repository 365, which stores the success fingerprint of each deployed policy. Comparator 370 accesses (in read mode only) configuration repository 325 and success fingerprint repository 365 for calculating the similarity indexes of the failure endpoints (115f) of each deployed policy. Comparator 370 controls (in read/write mode) similarity index repository 375, which stores the similarity indexes. Prioritizer 380 accesses (in read mode only) similarity index repository 375 for prioritizing the failure endpoints (115f) of each deployed policy. Prioritizer 380 controls notifier 385, which is used to notify the prioritization of the failure endpoints (115f) to the system administrator. Corrector 390 further accesses (in read mode only) configurator repository 325 for determining a suggested (rule) correction of the applicability rule of each deployed policy according to a comparison of the characteristics of endpoint computing machine 115 wherein the policy has not been applied with the corresponding success fingerprint. Corrector 390 controls notifier 385 for notifying the rule correction of each deployed policy to the system administrator.

Moving to FIG. 4A-FIG. 4D, an activity diagram is shown describing the flow of activities relating to an implementation of the solution according to an embodiment of the present disclosure.

Figure 4A:
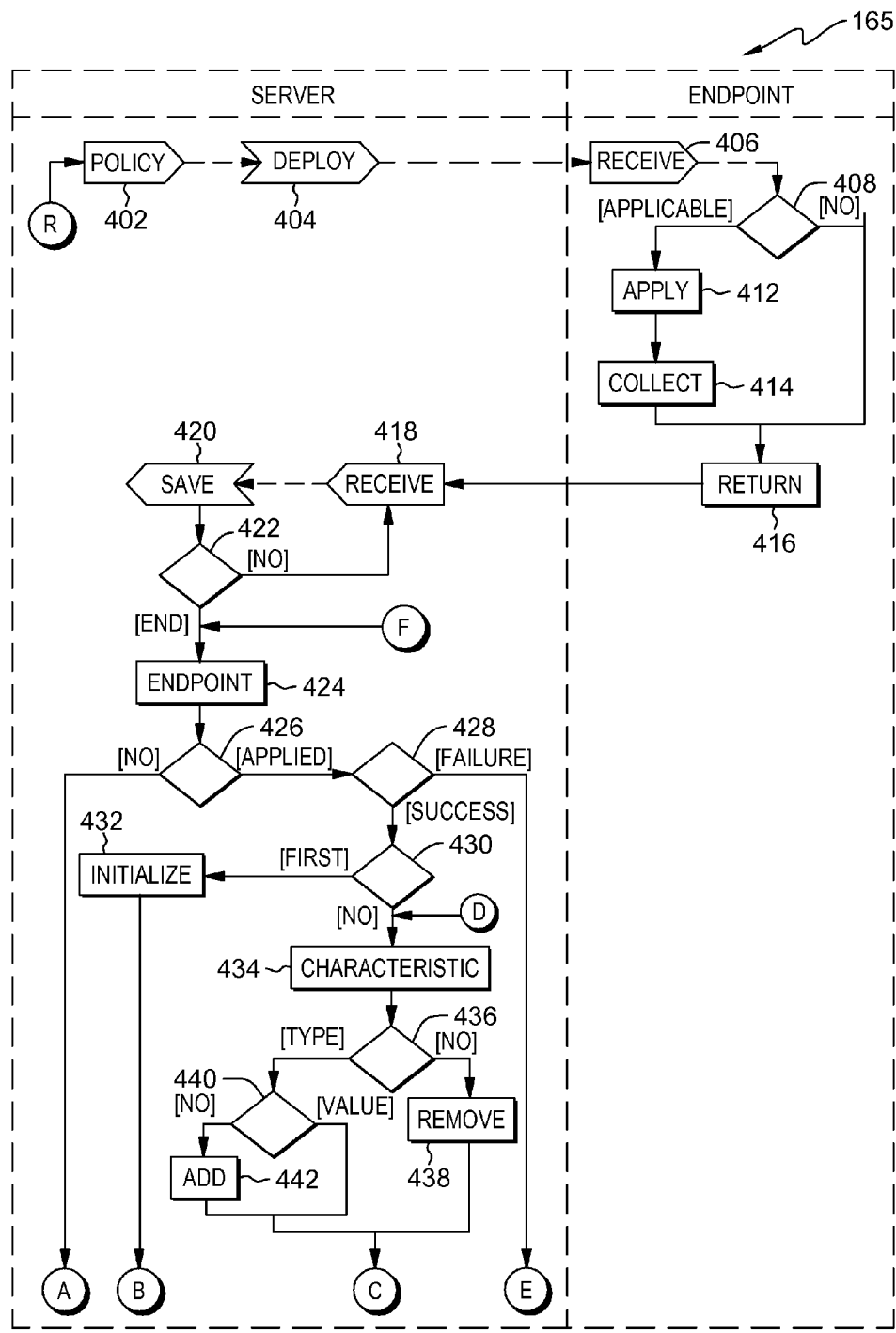
FIG. 4A is flowchart describing the management of computing machines, according to an embodiment of the present disclosure.

Particularly, FIG. 4A represents an exemplary process that may be used to manage the endpoints with policy module 165. In this respect, each block of the diagram may correspond to one or more executable instructions for implementing the specified logical function on the server and on each endpoint.

Policy module 165 passes data from block 402 to block 404 in the swim-lane of the server as soon as the application of a specific policy has to be enforced according to its scheduling in a corresponding management plan. In response thereto, a deployer extracts the policy from the policy repository and deploys it to all the endpoints by submitting the policy to the deployment infrastructure.

Moving to the swim-lane of a generic endpoint, policy module 165 is listening at block 406 for the deployment of any policy. As soon as a (new) policy is received, policy module 165 passes to block 408 wherein the verifier evaluates the applicability rule of the policy. For example, the applicability rule is defined by an expression (written in a so-called relevance language in the IEM) which combines one or more applicability conditions (each based on one or more static characteristics of the endpoint with logical operators and/or programming constructs. The flow of activity then branches according to the result of the evaluation of the applicability rule in block 408. Particularly, if the applicability rule is evaluated as "applicable: (i.e., meaning that the policy is relevant to the endpoint). The applier in block 412 applies the policy on the endpoint (assuming that the endpoint is not already compliant with the policy as determined by evaluating a corresponding compliance condition thereof.). For this purpose, the applier in block 412 controls the submission of its application commands (suitably translated into actual commands that may be executed on the endpoint) according to the sequence defined in the corresponding application action. For example, this may involve the downloading of the package associated with the policy (from the package repository) and its launching, the deletion of files, the updating of configuration parameters. As soon as the application of the policy has been completed, the collector at block 414 collects one or more dynamic characteristics of the endpoint as indicated in the policy. The process then descends into block 416. Block 416 is also reached directly (without performing any action on the endpoint) from the block 408 when the applicability rule is not evaluated as "applicable" (i.e., the policy is not relevant to the endpoint or the endpoint is already compliant with the policy). In any case, at this point the policy module 165 returns the result of the application of the policy on the endpoint to the deployer. Particularly, this result indicates whether the policy has been applied or has not been applied on the endpoint. When the policy has been applied, the result indicates whether the application of the policy succeeded or failed, with the addition of the corresponding dynamic characteristics of the endpoint.

Referring back to the swim-lane of the server, the deployer is listening at block 418 for the results of the application of the policy on the endpoints. As soon as a (new) result is received, policy module 165 passes data to block 420 wherein the deployer saves (i.e., updates) the configuration repository accordingly. A test is then made at block 422, wherein the deployer verifies whether the deployment of the policy to the endpoints has been completed after receiving all the corresponding results or in any case after a pre-defined time limit. If not verified, policy module 165 returns to block 418 to repeat the same operations described above.

Conversely, a loop is performed for determining the success signature of the policy. The loop begins at block 424, wherein the consolidator takes a (current) endpoint into account (starting from a first one in any arbitrary order). The consolidator then verifies at block 426 whether the policy has been applied on the endpoint (as indicated in the configuration repository). If the policy has been applied, the consolidator further verifies at block 428 the result of the application of the policy (as also indicated in the configuration repository). If the application of the policy succeeded (meaning that a success endpoint is under processing) the flow of activity moves into block 430. In block 430, the consolidator may also apply a reduction algorithm, which only selects a (reduced) percentage of the success endpoints to be taken into account (including all success endpoints when the reduction percentage is set to 100%), with the other success endpoints which are instead discarded by following the same flow of activity as of the failure endpoints. For example, the reduction algorithm may select the success endpoints randomly according to the reduction percentage. In this way, the success endpoints that are processed (for determining the successful fingerprint) are only a subset thereof. In any case, this subset is defined so as to be statistically significant. For example, the subset can be defined by setting the reduction percentage to 20-80%, to 30-70%, 40-60%, or as 50%. This leads to a considerable saving of computational time without substantially affecting the accuracy of obtained result. When the success endpoint has been selected, the consolidator now verifies whether the successful fingerprint has been initialized. If the successful fingerprint has not been initialized 432 (i.e., the first success endpoint that is processed), the consolidator adds all the static/dynamic characteristics of the success endpoint to the successful fingerprint. For example, each characteristic may be defined by a key/value pair indicating its characteristic type (e.g., service level, vendor, and/or user group) and a corresponding characteristic value (e.g., numbers, ranges, strings, etc.), respectively. Conversely, an inner loop is entered for processing the characteristics of the success endpoint (different from the first one). The loop begins at block 434 wherein the consolidator takes a current characteristic into account (starting from a first characteristic in any arbitrary order). The consolidator then verifies at block 436 whether the characteristic type of this characteristic is contained within the success fingerprint. If the characteristic type is not contained within of a characteristic type in common to all of the successful fingerprints, the consolidator at block 438 removes the characteristic from the success fingerprint. Conversely, a test is made at block 440 wherein the consolidator verifies whether the characteristic type is contained within a characteristic type in the success fingerprint associated with the same characteristic type. If the characteristic type is not contained within a characteristic type in the success fingerprint in associated with the same characteristic type, the consolidator at block 442 adds the characteristic value to the characteristic type in the success fingerprint. In other embodiments, the characteristic types of the success fingerprint may be determined in other ways (e.g., characteristic types present with at least one predefined percentage in the success endpoints).

Figure 4B:
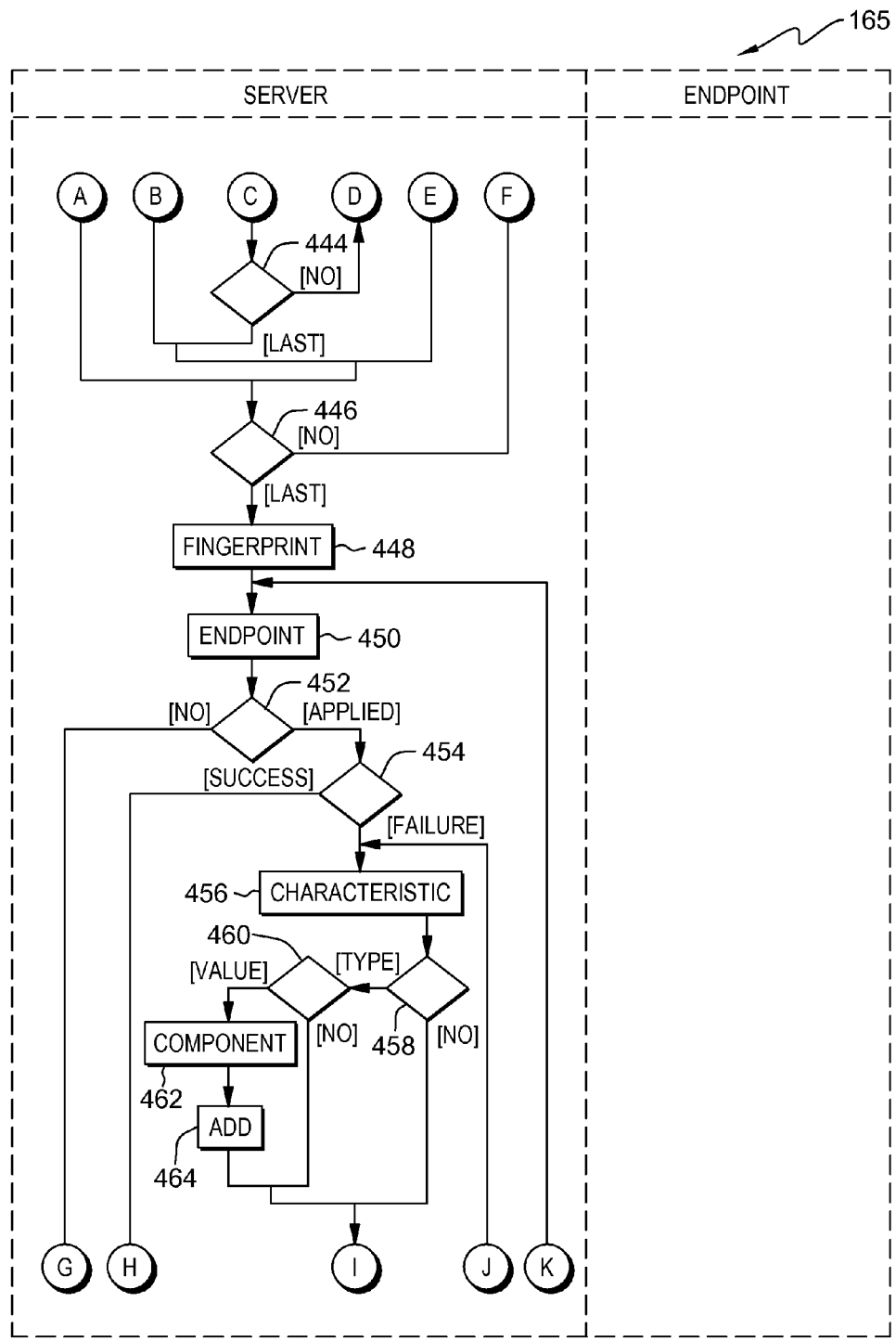
FIG. 4B is a continuation of the flowchart describing the management of computing machines, according to an embodiment of the present disclosure.

FIG. 4B continues the flowchart from points A, B, C, D, E, and F (which are present in FIG. 4A. The flow of activity merges again at block 444 from block 438, from block 442 or directly from block 440 (when the characteristic value is already contained within the success fingerprint in association with the same characteristic type). At this point, the consolidator verifies whether a last characteristic of the success endpoint has been processed. If the last characteristic of the success endpoint has not been processed, the flow of activity returns to block 434 to repeat the same operations on a next characteristic of the success endpoint. Conversely, once all the characteristics of the success endpoint have been processed, the flow of activity descends into block 446, which is also reached from the block 432 or directly from block 426 (when the policy has not been applied on the endpoint) or from the block 428 (when the application of the policy failed). At this point, the consolidator verifies whether a last endpoint has been processed. If the last endpoint has not been processed, policy module 165 returns to block 424 to repeat the same operations on a next endpoint. Conversely, once all the endpoints have been processed, the consolidator at block 448 saves the success fingerprint so obtained into the success fingerprint repository.

The success fingerprint is defined by the characteristic types which are in common to all the success endpoints. Each success fingerprint is associated with the union of the corresponding characteristic values of all the success endpoints. For example, the characteristics of the following (very simple) success endpoints is shown as:

$EPs_1=\{(\text{OperatingSystem}=OSa),(\text{Version}=7),(\text{Memory}=10)\}$ $EPs_2=\{(\text{OperatingSystem}=OSa),(\text{Version}=8),(\text{Memory}=50)\}$ $EPs_3=\{(\text{OperatingSystem}=OSa),(\text{Version}=8),(\text{Memory}=5),(\text{Bluetooth}=4)\}$ $EPs_4=\{(\text{OperatingSystem}=OSa),(\text{Version}=8),(\text{Memory}=20)\}$ The following successful fingerprint (SFP) is provided by:

$SFP=\{(\text{OperatingSystem}=OSa),(\text{Version}=\{7,8\}),(\text{Memory}=\{5,10,20,50\})\}$ This indicates the same operating system of all the success endpoints, all its versions, and the free memory space of each success endpoint.

A further loop is then performed for calculating the similarity indexes of the failure endpoints. The loop begins at block 450, wherein the comparator takes a (current) endpoint into account (starting from a first endpoint in any arbitrary order). The comparator then verifies at block 452 whether the policy has been applied on the endpoint (as indicated in the configuration repository). If the policy has been applied on the endpoint, the comparator further verifies at the result of the application of the policy (as indicated in the configuration repository as well) block 454. Particularly, if the application of the policy failed (i.e., a failure endpoint is being processed), an inner loop is entered for processing the characteristics of the failure endpoint. The loop begins at block 456 wherein the comparator takes a (current) characteristic into account (starting from a first one in any arbitrary order). The comparator then verifies at block 458 whether the characteristic type of this characteristic is contained within the success fingerprint. If the characteristic type of this characteristic is contained within the success fingerprint (i.e., the characteristic type matches the ones of the successful fingerprint), the consolidator at block 460 further verifies whether the characteristic value of this characteristic is contained within in the success fingerprint in association with the same characteristic type. If the characteristic value of this characteristic is contained within in the success fingerprint in association with the same characteristic type (i.e., the characteristic value as well matches the ones of the successful fingerprint), the comparator at block 462 calculates a corresponding similarity component (SC) of the similarity index as:

$$SC=e^{1-NV} \qquad \text{(eq. 2)}$$

Where NV is the number of the characteristic values that are associated with the same characteristic type in the success fingerprint. Thus, the value of the similarity component is maximum when the characteristic type has a single characteristic value in the success fingerprint (i.e., $SC=e^{1-1}=e^0=1$)

and it decreases exponentially as the number of characteristic values in the success fingerprint increases (i.e., $SC=e^{1-2}=e^{-1}=0.35$ for NV=2, $SC=e^{1-3}=e^{-2}=0.13$ for NV=3, $SC=e^{1-4}=e^{-3}=0.05$ for NV=4 and so on). In other embodiments, the similarity component may vary with the corresponding number of characteristic values in different, additional, or alternative ways (e.g., with linear or logarithmic laws). Continuing to block 464, the comparator increments the similarity index (initialized at 0) by the similarity component. Thus, the similarity component contributes to the similarity index with a weight that is higher when the number of characteristic values in the success fingerprint is low (and then matching by the characteristic value of the failure endpoint is more significant since few, down to none, alternatives are possible). The similarity component decreases very fast as the number of characteristic values in the success fingerprint becomes higher (and then its matching by the characteristic value of the failed fingerprint is less and less significant since many alternatives are possible).

Figure 4C:
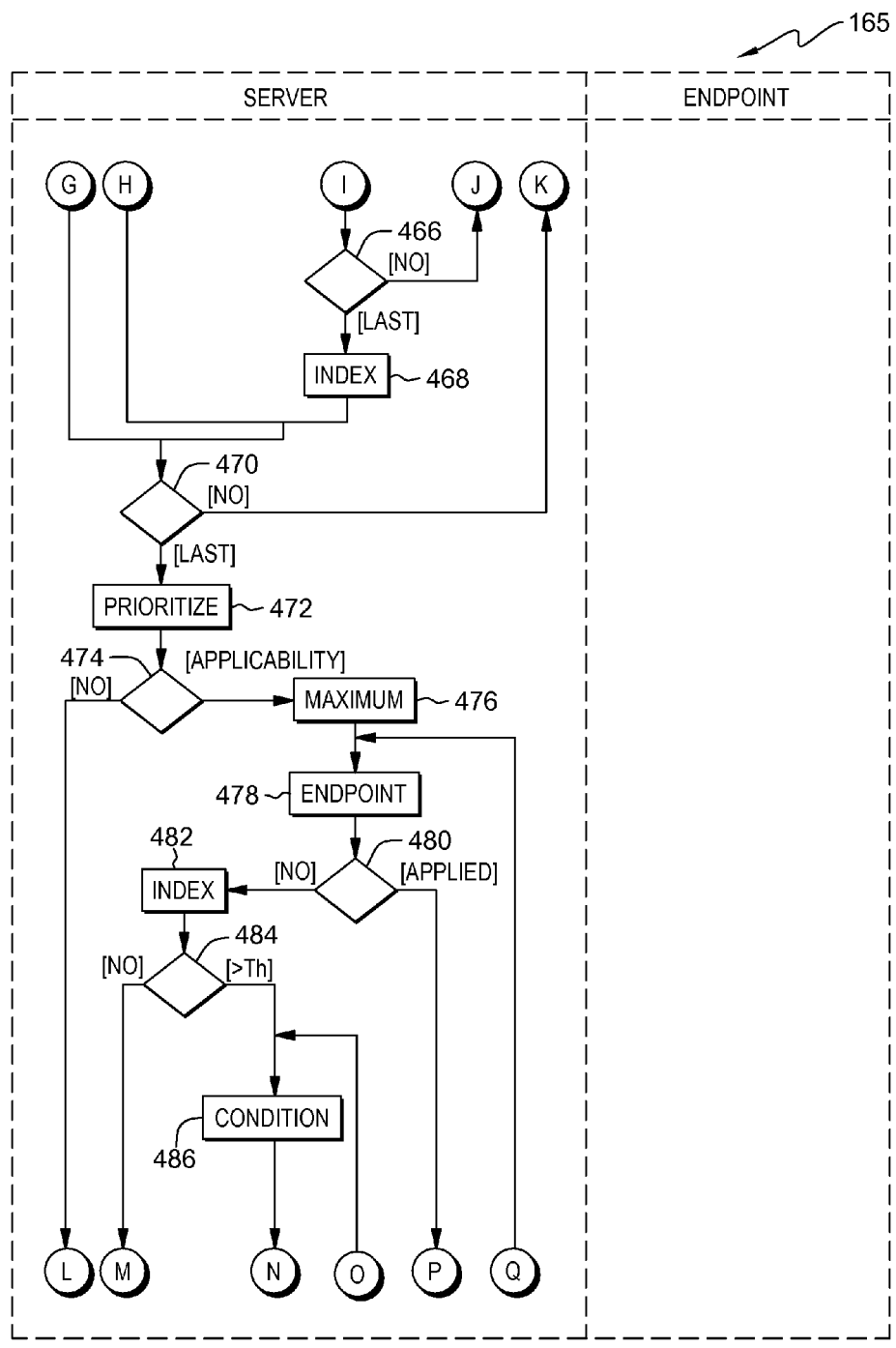
FIG. 4C is a further continuation of the flowchart describing the management of computing machines, according to an embodiment of the present disclosure.

FIG. 4C is a further continuation of the flowchart describing the management of computing machines, according to an embodiment of the present disclosure.

The flow of activity merges again at block 466 from the block 464 or directly from the block 458 (when the characteristic type of the failure endpoint is not contained within the success fingerprint) or from the block 460 (when the characteristic value of the failure endpoint is not contained within the success fingerprint in association with the same characteristic type). At this point, the comparator verifies whether a last characteristic of the failure endpoint has been processed. If the last characteristic of the failure endpoint has not been processed, the flow of activity returns to the block 456 to repeat the same operations on a next characteristic of the failure endpoint. Conversely, once all the characteristics of the failure endpoint have been processed, the flow of activity descends into block 468 wherein the comparator saves the similarity index so obtained into the similarity index repository (in association with the failure endpoint). The processing proceeds to block 470, which is also reached directly from the block 452 (when the policy has not been applied on the endpoint) or from the block 454 (when the application of the policy succeeded). At this point, the comparator verifies whether a last endpoint has been processed. If not, the flow of activity returns to the block 450 to repeat the same operations on a next endpoint.

The similarity indexes of the failure endpoints depend on their characteristics matching the ones of the success fingerprint. The maximum value of the similarity index is reached by any failure endpoint whose characteristics match all the endpoints of the successful fingerprint (as it is always true for the success endpoints by definition). The similarity index instead decreases as the characteristics of the failure endpoints do not match the ones of the successful fingerprint, especially when they have a lower number of characteristic values. With reference to the above-mentioned example, the maximum value of the similarity index is $SImax=e^{1-1}+e^{1-2}+e^{1-3}=e^0+e^{-1}+e^{-3}=1+0.37+0.05=1.42$.

The similarity index ($SI_i$) of the following exemplary failure endpoints is:

$EPf_1=\{(OperatingSystem=OSb),(Version=7),(Memory=5),(Bluetooth=3)\}$ $SI_1=e^{1-2}+e^{1-3}=e^{-1}+e^{-3}=0.37+0.05=0.42$, $EPf_2=\{(OperatingSystem=OSa),(Version=7),(Memory=20),(Bluetooth=3)\}$ $SI_2=e^{1-1}+e^{1-2}+e^{1-3}=e^0+e^{-1}+e^{-3}=1+0.37+0.05=1.42$, $EPf_3=\{(OperatingSystem=OSa),(Version=6),(Memory=51),(Bluetooth=3)\}$ $SI_3=e^{1-1}\pm e^{1-3}=e^0+e^{-3}=1+0.05=1.05$, $EPf_4=\{(OperatingSystem=OSa),(Version=6),(Memory=25),(Bluetooth=4)\}$ $SI_2=e^{1-1}=e^0=1$.

With reference again to the block 470, once all the endpoints have been processed, the prioritizer at block 472 creates a troubleshooting list by arranging the failure endpoints in decreasing order of the corresponding similarity indexes. For example, the failure endpoints may be divided in groups according to corresponding ranges of their similarity indexes, such as with very high priority for its maximum value, high priority for 90-99% of its maximum value, medium priority for 50-89% of its maximum value, low priority for 30-49% of its maximum value and very low priority (down to null with the discarding of the failure endpoints) for 0-29% of its maximum value. The troubleshooting list suggests how to prioritize the troubleshooting of the failure endpoints according to the corresponding relevance of the policy as inferred by the above-described method (and quantified by their similarity indexes). Particularly, precedence may be given to the failure endpoints that are more similar to the success endpoints (starting from the ones having the same characteristics that are common to all of them), wherein it is more likely that the corresponding policy had actually to be applied but it failed because of some problems. Conversely, the troubleshooting may be delayed for the failure endpoints that significantly differ from the success endpoints (and may avoid troubleshooting for the ones that are completely different), wherein it is more likely that the policy had not been applied.

The process then descends into block 474, wherein the corrector verifies whether the applicability rule of the policy is defined. If the applicability rule of the policy is defined, the corrector at block 476 calculates the maximum value of the similarity index corresponding to the success endpoints (if not already done before to create the troubleshooting list). A further loop is then performed for determining the rule correction of this applicability rule. The loop begins at block 478, wherein the corrector takes a (current) endpoint into account (starting from a first one in any arbitrary order). The corrector then verifies at block 480 whether the policy has been applied on the endpoint (as indicated in the configuration repository). If policy has been not applied on the endpoint (as indicated in the configuration repository), the corrector at block 482 calculates the similarity index of this endpoint (hereinafter, referred to as excluded endpoint) by executing the same operations described above for the failure endpoints (at the blocks 456-468). A test in now performed by block 484, wherein the corrector compares the similarity index of the excluded endpoint with a relevance threshold value depending on its maximum value (e.g., the threshold value equal to 80-99%, preferably 83-97%, more preferably 85-95% and still more preferably 87-95% such as 90% thereof). In other embodiments, the relevance threshold value may be equal to the maximum value. If the similarity index of the excluded endpoint (hereinafter, referred to as relevant excluded endpoint) is (possibly strictly) higher than the relevance threshold, an inner loop is entered for processing the applicability rule of the policy. In some embodiments, the relevant excluded computing machines may be selected without using any relevance threshold (e.g., by a neural network). The loop begins at block 486 wherein the corrector takes a (current) applicability condition, which should be fulfilled to fulfill the applicability rule, take into account starting from a first one in any arbitrary order. In some embodiments, the applicability conditions may be of any type (e.g., commands for updating the applicability rule) and may be determined in any manner (e.g., by inference techniques).

Figure 4D:
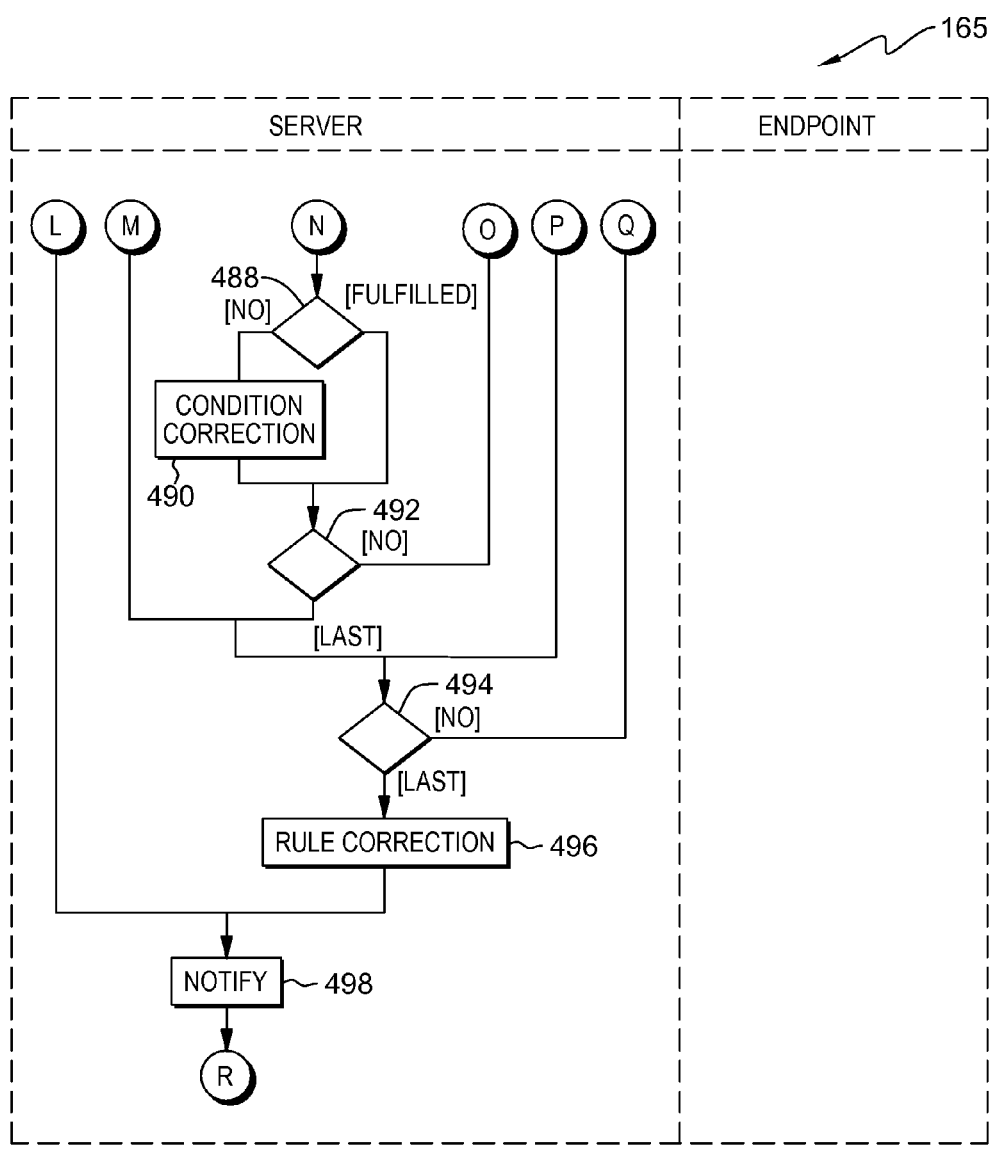
FIG. 4D is yet a further continuation of the flowchart describing the management of computing machines, according to an embodiment of the present disclosure.

FIG. 4D is yet a further continuation of the flowchart describing the management of computing machines, according to an embodiment of the present disclosure.

The corrector then verifies at block 488 whether the (static) characteristics of the relevant excluded endpoint fulfil this applicability condition. If the (static) characteristics of the relevant excluded endpoint does not fulfil this applicability condition (i.e., the applicability condition caused, alone or in combination with other applicability conditions, the missing application of the policy on the relevant excluded endpoint), the corrector at block 490 determines a condition correction which is adapted to make the applicability condition fulfilled by the relevant excluded endpoint (which condition correction is saved into a dedicated working variable in association with the relevant excluded endpoint). For example, if an applicability condition of memory threshold value $\geq 100$ Mbytes is not fulfilled because the memory threshold value of the relevant excluded endpoint is 98 Mbytes, the corresponding condition correction is updating the applicability condition to Memory threshold value $\geq 100$. If an applicability condition of frequency threshold value >3 is not fulfilled because the processing frequency of the relevant excluded endpoint is 3 GHz, the corresponding condition correction is updating the applicability condition to Frequency$\geq 3$. The process then descends into block 492 (where the same point is also reached directly from the block 488 when the relevant excluded endpoint fulfills the applicability condition). At this point, the corrector verifies whether a last applicability condition has been processed. If the applicability condition has not processed, the flow of activity returns to the block 486 to repeat the same operations on a next applicability condition. Conversely, once all the applicability conditions have been processed, the process descends into block 494 (which is also reached directly from the block 480 when the policy has not been applied on the endpoint or from the block 484 when the similarity index does not reach the relevance threshold value). At block 494, the corrector verifies whether a last endpoint has been processed. If the last endpoint has not been processed, the flow of activity returns to the block 478 to repeat the same operations on a next endpoint. Conversely, if all the endpoints have been processed, the corrector at block 496 determines the rule correction for the applicability rule. For example, for each applicability condition that is not fulfilled by one or more relevant excluded endpoints (such that corresponding condition corrections have been determined), a condition correction is added to the rule correction. The condition correction of the rule correction is set to make the applicability condition fulfilled by all the relevant excluded endpoints with the minimum relaxation of the applicability condition. With reference to the above-mentioned example, in an exemplary embodiment the following condition corrections are determined for the relevant excluded endpoints:

Memory$\geq 98$, Frequency$\geq 3$
–, Frequency$\geq 3.5$
Memory$\geq 95$, Frequency$\geq 3.2$.

In this case, the rule correction comprises a condition correction for updating the applicability condition memory threshold value $\geq 100$ to memory threshold value $\geq 95$ and a condition correction for updating the applicability condition frequency threshold value >3 to frequency threshold value $\geq 3.5$. Therefore, the rule correction suggests how to update the applicability rule to make the policy applicable on all the relevant excluded endpoints in order to allow the extension of the application of the policy to other endpoints whose compliance therewith may be relevant. Indeed, as far as their compliance with the policy is concerned, the relevant excluded endpoints are very similar to the success endpoints (especially the ones having the same characteristics that are common to all of them). Thus, it is likely that the corresponding policy had to be applied on the relevant excluded endpoints but the application of corresponding policy is not done due to an error in the applicability rule.

The flow of activity then descends into block 498 from the block 496. The same point of block 498 is also reached directly from the block 474 when the policy has no applicability rule. At this point, the notifier sends an e-mail to the system administrator by attaching the troubleshooting list (to be used for controlling the troubleshooting of the failure endpoints) and the rule correction, if any (to be used for controlling the correction of the applicability rule). The flow of activity then returns to block 402 waiting for the deployment of a next policy.

For example, an embodiment provides a method for managing a plurality of computing machines. However, the management of the computing machines may be of any type (for example, for asset inventory/discovery, security vulnerability detection/remediation, software license control) and it may be implemented under the control of any system (see below); moreover, the computing machines may be in any number and of any physical and/or virtual type (for example, other servers, tablets, Point Of Sale (POS) devices, Automated Teller Machines (ATMs), self-service kiosks).

Figure 5:
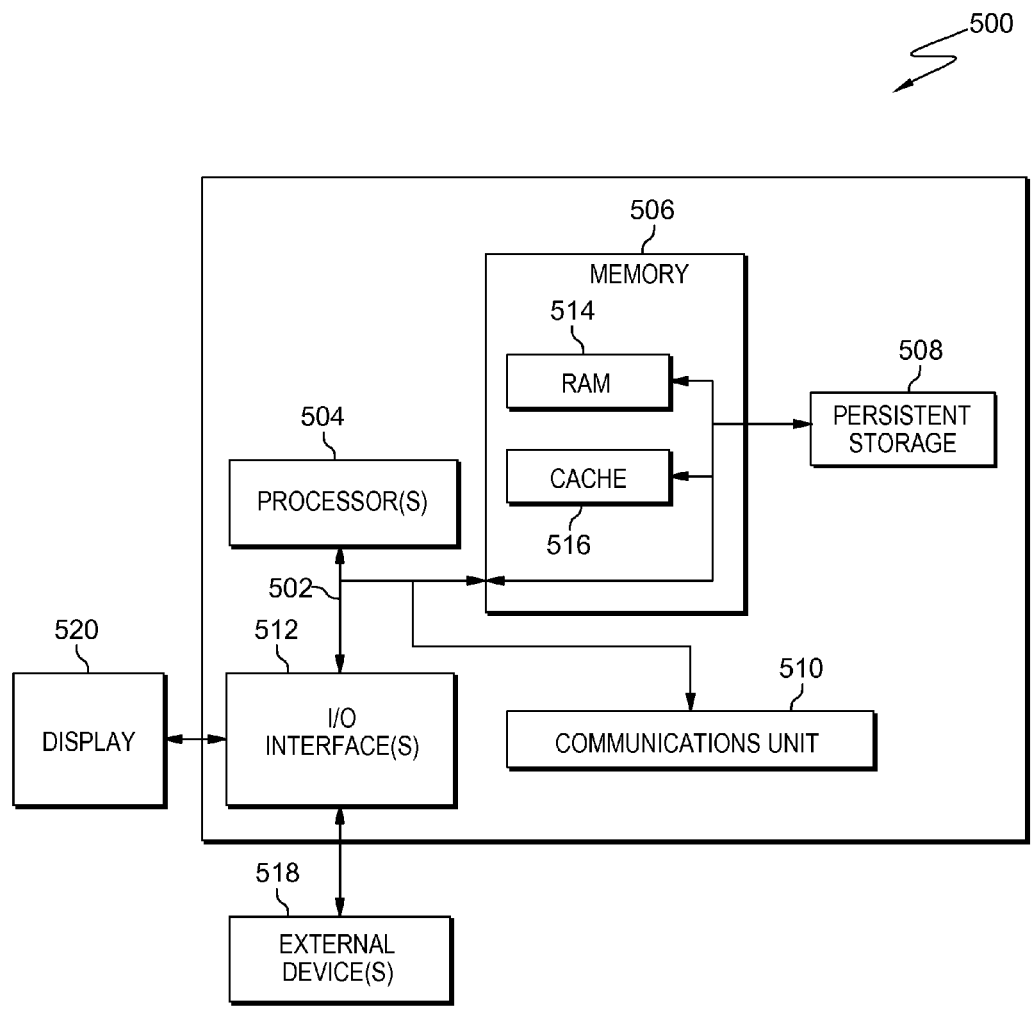
FIG. 5 depicts a block diagram of internal and external components of a computing device, in accordance with an embodiment of the present invention.

FIG. 5 depicts a block diagram of components of a computing device, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media.

In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a plurality of computing machines, the method comprising:
   executing, by one or more processors, a management activity on one or more computing machines;
   receiving, by one or more processors, a corresponding result of the execution of the management activity on the one or more computing machines;
   determining, by one or more processors, a success fingerprint according to one or more characteristics of the one or more computing machines based on a comparison with the one or more computing machines, wherein the management activity is successfully executed on the one or more computing machines by:
      determining the success fingerprint according to one or more characteristic values of one or more common characteristics of one or more characteristic types, wherein the management activity is successfully executed on the one or more computing machines,
      assigning the one or more common characteristic types to the success fingerprint, and
      associating a union of one or more characteristic values of the one or more common characteristic types of the one or more computing machines, wherein the management activity is successfully executed on the one or more computing machines, with the one or more common characteristic types of the success fingerprint;
   calculating, by one or more processors, a similarity index for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines;
   prioritizing, by one or more processors, one or more failures of the one or more computing machines, wherein the management activity is not successfully executed on the one or more computing machines;
   outputting, by one or more processors, an indication of the one or more failures of the one or more computing machines, wherein the management activity is not successfully executed on the one or more computing machines, for use in troubleshooting the one or more failures; and
   reducing, by one or more processors, a processing time and costs associated with troubleshooting the one or more failures by identifying the prioritized one or more failures of the one or more computing machines.

2. The method according to claim 1, further comprises:
   receiving, by one or more processors, one or more dynamic characteristics of the one or more characteristics of the one or more computing machines wherein the one or more dynamic characteristics received on the one or more computing machines are associated with the execution of the management activity thereon, wherein the one or more characteristics of the one or more computing machines which are associated with an indication of a characteristic type and of a characteristic value of the characteristic type.

3. The method according to claim 1, wherein calculating the one or more similarity indexes for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines, comprises:
   associating, by one or more processors, a similarity component for one or more matching characteristic types of the one or more computing machines, wherein the management activity is not successfully executed on the one or more computing machines which correspond to one or more characteristic values contained in the one or more matching characteristic types of the one or more computing machines, wherein the management activity is not successfully executed on the one or more computing machines.

4. The method according to claim 3, wherein the similarity component contributes to the similarity index with a weight decreasing with a number of the one or more characteristic values which correspond to one or more matching characteristic types of the success fingerprint, wherein the similarity component decreases exponentially with a number of the one or more characteristic values, which correspond to the one or more matching characteristic types of the success fingerprint.

5. The method according to claim 1, wherein at least part of the one or more computing machines, wherein the management activity is not successfully executed on the one or more computing machines is a subset of the one or more computing machines wherein the management activity is not successfully executed on the one or more computing machines.

6. The method according to claim 1, wherein executing the management activity on the one or more computing machines, comprises:
   calculating, by one or more processors, one or more similarity indexes for one or more excluded computing machines of the one or more computing machines having further characteristics not fulfilling an applicability rule;
   selecting, by one or more processors, one or more computing machines of the one or more excluded computing machines according to the one or more similarity indexes associated with the one or more excluded computing machines;
   determining, by one or more processors, one or more condition corrections for one or more relevant excluded computing machines wherein the condition corrections are adapted to fulfil the applicability rule using one or more characteristics of the one or more relevant excluded computing machines;
   determining, by one or more processors, a rule correction according to the one or more condition corrections of the one or more relevant excluded computing machines; and
   outputting, by one or more processors, an indication of the rule correction used to correct the applicability rule.

7. The method according to claim 6, wherein selecting the one or more computing machines of the one or more excluded computing machines, according to the one or more similarity indexes associated with the one or more excluded computing machines, comprises:
   calculating, by one or more processors, a maximum value of the one or more similarity indexes associated with the one or more computing machines wherein the management activity is successfully executed on the one or more computing machines, and
   selecting, by one or more processors, the one or more relevant excluded computing machines according to a comparison of the one or more similarity indexes with a relevance threshold depending on the maximum value of the one or more similarity indexes.

8. A computer program product for managing a plurality of computing machines, the computer program product comprising a computer readable storage medium having program instructions embodied therewith, the program instructions executable by a computing system comprising:
   program instructions to execute a management activity on one or more computing machines;
   program instructions to receive a corresponding result of an execution of the management activity on the one or more computing machines;
   program instructions to determine a success fingerprint according to one or more characteristics of the one or more computing machines based on a comparison with the one or more computing machines, wherein the management activity is successfully executed on the one or more computing machines by:
      program instructions to determine the success fingerprint according to one or more characteristic values of one or more common characteristics of one or more characteristic types, wherein the management activity is successfully executed on the one or more computing machines,
   program instructions to assign the one or more common characteristic types to the success fingerprint, and
   program instructions to associate a union of one or more characteristic values of the one or more common characteristic types of the one or more computing machines, wherein the management activity is successfully executed on the one or more computing machines, with the one or more common characteristic types of the success fingerprint;
   program instructions to calculate the similarity index for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines;
   program instructions to prioritize one or more failures of the one or more computing machines, wherein the management activity is not successfully executed on the one or more computing machines;
   program instructions to output an indication of the one or more failures of the one or more computing machines, wherein the management activity is not successfully executed on the one or more computing machines, for use in troubleshooting the one or more failures; and
   program instructions to reduce a processing time and costs associated with troubleshooting the one or more failures by identifying the prioritized one or more failures of the one or more computing machines.

9. The computer program product according to claim 8, further comprises:
   program instructions to receiving one or more dynamic characteristics of the one or more characteristics of the one or more computing machines wherein the one or more dynamic characteristics received on the one or more computing machines are associated with the execution of the management activity thereon, wherein the one or more characteristics of the one or more computing machines which are associated with an indication of a characteristic type and of a characteristic value of the characteristic type.

10. The computer program product according to claim 8, wherein the program instructions to calculate the one or more similarity indexes for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines, comprises:
   program instructions to associate a similarity component for one or more matching characteristic types of the one or more computing machines, wherein the management activity is not successfully executed on the one or more computing machines which correspond to one or more characteristic values contained in the one or more characteristic values of the one or more matching characteristic types of the one or more computing machines, wherein the management activity is not successfully executed on the one or more computing machines.

11. The computer program product according to claim 10, wherein the similarity component contributes to the similarity index with a weight decreasing with a number of the one or more characteristic values which correspond to one or more matching characteristic types of the success fingerprint, wherein the similarity component decreases exponentially with a number of the one or more characteristic values which correspond to the one or more matching characteristic types of the success fingerprint.

12. The computer program product according to claim 8, wherein at least part of the one or more computing machines, wherein the management activity is not successfully executed on the one or more computing machines is a subset of the one or more computing machines wherein the management activity is not successfully executed on the one or more computing machines.

13. The computer program product according to claim 8, wherein the program instructions to execute the management activity on the one or more computing machines, comprise:
  program instructions to calculate one or more similarity indexes for one or more excluded computing machines of the one or more computing machines having further characteristics not fulfilling an applicability rule;
  program instructions to select one or more computing machines of the one or more excluded computing machines according to the one or more similarity indexes associated with the one or more excluded computing machines;
  program instructions to determine one or more condition corrections for one or more relevant excluded computing machines wherein the condition corrections are adapted to fulfil the applicability rule using one or more characteristics of the one or more relevant excluded computing machines;
  program instructions to determine a rule correction according to the one or more condition corrections of the one or more relevant excluded computing machines; and
  program instructions to output an indication of the rule correction used to correct the applicability rule.

14. The computer program product according to claim 13, wherein the program instructions to select the one or more computing machines of the excluded computing machines according to associated similarity indexes, comprises:
  program instructions to receiving one or more dynamic characteristics of the one or more characteristics of the one or more computing machines wherein the one or more dynamic characteristics received on the one or more computing machines are associated with the execution of the management activity thereon, wherein the one or more characteristics of the one or more computing machines which are associated with an indication of a characteristic type and of a characteristic value of the characteristic type.

15. A computer system, the computer system comprising:
  one or more computer processors;
  one or more computer readable storage media; and
  program instructions stored on the one or more computer readable storage media for execution by at least one of the one or more processors, the program instructions comprising:
    program instructions to execute a management activity on one or more computing machines;
    program instructions to receive a corresponding result of an execution of the management activity on the one or more computing machines;
    program instructions to determine a success fingerprint according to one or more characteristics of the one or more computing machines based on a comparison with the one or more computing machines, wherein the management activity is successfully executed on the one or more computing machines by:
      program instructions to determine the success fingerprint according to one or more characteristic values of one or more common characteristics of one or more characteristic types, wherein the management activity is successfully executed on the one or more computing machines,
      program instructions to assign the one or more common characteristic types to the success fingerprint, and
      program instructions to associate a union of one or more characteristic values of the one or more common characteristic types of the one or more computing machines, wherein the management activity is successfully executed on the one or more computing machines, with the one or more common characteristic types of the success fingerprint;
    program instructions to calculate a similarity index for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines;
    program instructions to prioritize one or more failures of the one or more computing machines, wherein the management activity is not successfully executed on the one or more computing machines;
    program instructions to output an indication of the one or more failures of the one or more computing machines, wherein the management activity is not successfully executed on the one or more computing machines, for use in troubleshooting the one or more failures; and
    program instructions to reduce a processing time and costs associated with troubleshooting the one or more failures by identifying the prioritized one or more failures of the one or more computing machines.

16. The computer system according to claim 15, further comprises:
  program instructions to receiving one or more dynamic characteristics of the one or more characteristics of the one or more computing machines wherein the one or more dynamic characteristics received on the one or more computing machines are associated with the execution of the management activity thereon, wherein the one or more characteristics of the one or more computing machines which are associated with an indication of a characteristic type and of a characteristic value of the characteristic type.

17. The computer system according to claim 15, wherein the program instructions to calculate the similarity index for the one or more computing machines, wherein the management activity is not successfully executed on the one or more computing machines by comparing the one or more computing machines, wherein the management activity is not successfully executed on the one or more computing machines with the success fingerprint according to the one or more characteristics of the one or more computing machines, wherein the management activity is successfully executed on the one or more computing machines, comprises:

program instructions to associate a similarity component for one or more matching characteristic types of the one or more computing machines, wherein the management activity is not successfully executed on the one or more computing machines which correspond to one or more characteristic values contained in the one or more characteristic values of the one or more matching characteristic types of the one or more computing machines, wherein the management activity is not successfully executed on the one or more computing machines.

18. The computer system according to claim 17, wherein the similarity component contributes to the one or more similarity indexes with a weight decreasing with a number of the one or more characteristic values which correspond to one or more matching characteristic types of the success fingerprint, wherein the similarity component decreases exponentially with a number of the one or more characteristic values which correspond to the one or more matching characteristic types of the success fingerprint.

19. The computer system according to claim 15, wherein at least part of the one or more computing machines, wherein the management activity is not successfully executed on the one or more computing machines is a subset of the one or more computing machines wherein the management activity is not successfully executed on the one or more computing machines.

20. The computer system according to claim 15, wherein the program instructions to execute the management activity on the one or more computing machines, comprise:

program instructions to calculate one or more similarity indexes for one or more excluded computing machines of the one or more computing machines having further characteristics not fulfilling an applicability rule;

program instructions to select one or more computing machines of the one or more excluded computing machines according to the one or more similarity indexes associated with the one or more excluded computing machines;

program instructions to determine one or more condition corrections for one or more relevant excluded computing machines wherein the condition corrections are adapted to fulfil the applicability rule using one or more characteristics of the one or more relevant excluded computing machines;

program instructions to determine a rule correction according to the one or more condition corrections of the one or more relevant excluded computing machines; and program instructions to output an indication of the rule correction used to correct the applicability rule.

21. The computer system according to claim 20, wherein the program instructions to select the one or more computing machines of the excluded computing machines according to associated similarity indexes, comprise:

program instructions to calculate a maximum value of the similarity index associated with one or more computing machines wherein the management activity is successfully executed on the one or more computing machines, and program instructions to select the relevant excluded computing machines according to a comparison of the similarity indexes with a relevance threshold depending on a maximum value of the similarity index.

\* \* \* \* \*